W. E. BUDD.
CUSHION TIRE FOR VEHICLE WHEELS.
APPLICATION FILED JUNE 26, 1909.
951,053. Patented Mar. 1, 1910.
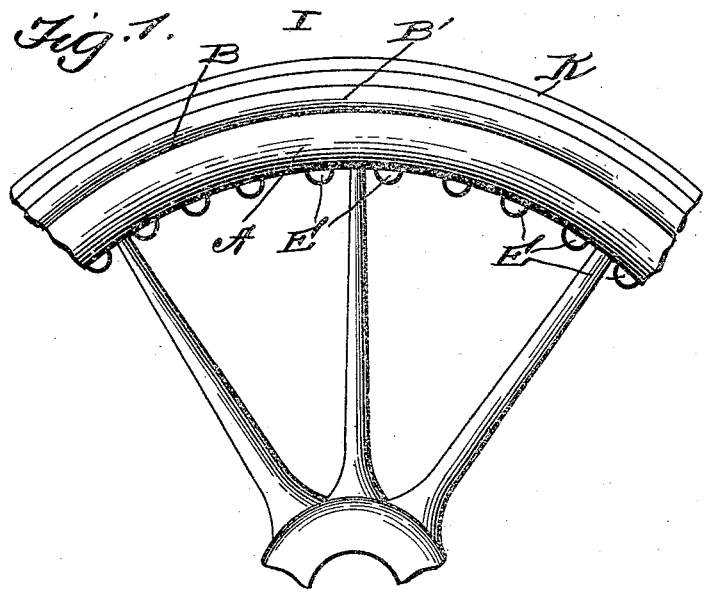
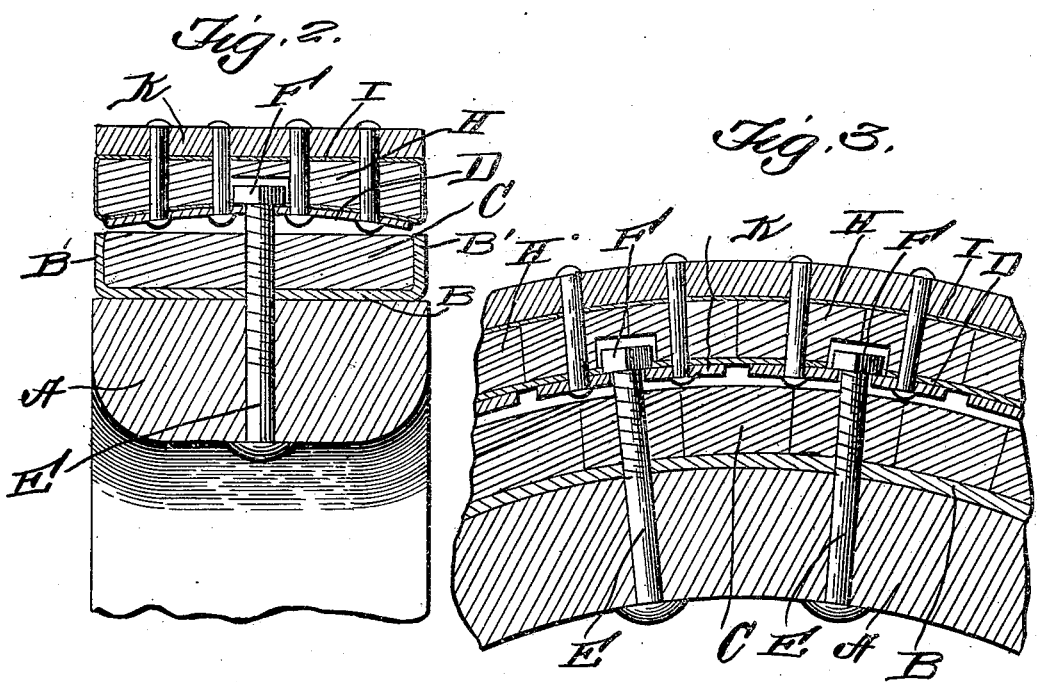
Witnesses
Inventor
William E. Budd,
By Franklin N. Hough
Attorney

UNITED STATES PATENT OFFICE.

WILLIAM E. BUDD, OF CHATHAM, NEW JERSEY.

CUSHION-TIRE FOR VEHICLE-WHEELS.

951,053. Specification of Letters Patent. Patented Mar. 1, 1910.

Application filed June 26, 1909. Serial No. 504,600.

*To all whom it may concern:*

Be it known that I, WILLIAM E. BUDD, a citizen of the United States, residing at Chatham, in the county of Morris and State of New Jersey, have invented certain new and useful Improvements in Cushion-Tires for Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tires for vehicle wheels and consists essentially in the provision of a tire made up of a series of sections, preferably of cork, with a tread surface of leather or other suitable material and in the provision of metallic springs intermediate the sections, thereby giving a resiliency to the tire when completed.

The invention comprises various details of construction, combinations and arrangements of parts which will be hereinafter fully described and then specifically defined in the appended claims.

I illustrate my invention in the accompanying drawings, in which:—

Figure 1 is a segment of a vehicle wheel showing a tire made in accordance with my invention. Fig. 2 is a cross sectional view through the rim or felly and the tire, and Fig. 3 is a longitudinal sectional view.

Reference now being had to the details of the drawings by letter, A designates the felly of a wheel and B is a circular channel plate fastened to the felly and provided with flanges B' along its marginal edges. Mounted within the channel plate are the strips C made up of segmental blocks, preferably of cork made by grinding the latter and compressing the same into compact sheets. D, D designate metallic springs positioned underneath said strips H, made up of segmental blocks of cork, and E designate bolts which are passed through registering apertures in the rim, channel plate, strips of cork and spring plate. Nuts F are mounted upon the threaded portion of said bolts, outside of the spring, and adapted to hold the same securely against the intervening layer or layers of cork. Outside and about the spring plates is a strip H of cork and, a suitable metallic sheath I incloses the same in order to protect it.

The outer tread surface of the tire, designated by letter K, is made preferably of leather or any other suitable tough material and is fastened in place by any suitable means passing through one or more of the underlying sections of which the tire is composed. Said outer layers of leather and cork are preferably fastened to the spring plate by means of rivets or other fastening means which are passed therethrough and clenched or otherwise secured.

From the foregoing, it will be noted that, by the provision of a tire made up of sections as shown and described, the steel plates or bands will afford additional strength to the tire and make the action of the cork more resilient, thus producing a substantial and durable tire.

What I claim to be new is:—

1. A cushioning tire comprising, in combination with a rim of a wheel, a channel plate fastened thereto, a plurality of concentric strips made up of segmental blocks of cork, one of which strips is mounted in said channel plate, steel springs intermediate of said strips, and a tread surface of leather secured to the outer of said strips of cork.

2. A cushioning tire comprising, in combination with a rim of a wheel, a channel plate fastened thereto, a plurality of concentric strips made up of segmental blocks of cork, one of which strips is mounted in said channel plate, steel springs intermediate of said strips, a metallic sheathing about said outer strip of cork, and a tread surface of leather.

3. A cushioning tire comprising, in combination with a rim of a wheel, a channel plate fastened thereto, a plurality of concentric strips made up of segmental blocks of cork, one of which is mounted in said channel plate, steel springs intermediate of said strips, a metallic sheathing about said outer strip of cork, a tread surface of leather, bolts passing through the rim, channel plate and one of said strips of cork and spring plates, and fastening means passing through said leather tread surface, sheathing and spring plates.

In testimony whereof I hereunto affix my signature in the presence of two witnesses.

WILLIAM E. BUDD.

Witnesses:
 MARIE A. MOONEY,
 LEROY A. GIBBY.